United States Patent
Kalhan (10) Patent No.: US 10,390,319 B2
(45) Date of Patent: Aug. 20, 2019

(54) DEVICE TO-DEVICE SYNCHRONIZATION SIGNAL (D2DSS) RESOURCE MANAGEMENT

(71) Applicants: Amit Kalhan, San Diego, CA (US); Kyocera Corporation, Kyoto (JP)

(72) Inventor: Amit Kalhan, San Diego, CA (US)

(73) Assignee: Kyocera Corporation, Kyoto (JP)

( * ) Notice: Subject to any disclaimer, the term of this patent is extended or adjusted under 35 U.S.C. 154(b) by 2 days.

(21) Appl. No.: 15/564,362

(22) PCT Filed: Apr. 8, 2016

(86) PCT No.: PCT/US2016/026782
§ 371 (c)(1),
(2) Date: Oct. 4, 2017

(87) PCT Pub. No.: WO2016/164823
PCT Pub. Date: Oct. 13, 2016

(65) Prior Publication Data
US 2018/0132202 A1 May 10, 2018

Related U.S. Application Data

(60) Provisional application No. 62/145,916, filed on Apr. 10, 2015.

(51) Int. Cl.
*H04W 8/00* (2009.01)
*H04W 28/16* (2009.01)
(Continued)

(52) U.S. Cl.
CPC ....... *H04W 56/0015* (2013.01); *H04W 8/005* (2013.01); *H04W 28/16* (2013.01);
(Continued)

(58) Field of Classification Search
CPC ......... H04W 56/0015; H04W 72/0406; H04W 28/16; H04W 76/14; H04W 56/0025; H04W 8/005; H04W 72/02; H04W 88/04
See application file for complete search history.

(56) References Cited

U.S. PATENT DOCUMENTS

2014/0328329 A1    11/2014 Novlan et al.
2016/0302250 A1*  10/2016 Sheng ..................... H04W 4/70
(Continued)

OTHER PUBLICATIONS

Huawei, Hisilicon; "Discussion on synchronization requirements for D2D"; R4-150273; 3GPP TSG-RAN WG4 Meeting #74; Athens, Greece; Feb. 9-13, 2015.
(Continued)

*Primary Examiner* — Brian T O Connor (57) ABSTRACT

An in-coverage (InC) user equipment (UE) device transmits a device-to-device synchronization signal (D2DSS) and device-to-device (D2D) discovery resource pool information message to an out-of-coverage (OoC) UE device. The D2DSS is based on timing information obtained directly from an eNB and based on at least one of a primary synchronization signal (PSS) and a secondary synchronization signal (SSS). The D2D discovery resource pool information message identifies a set of communication resources authorized for transmission of D2D discovery signals where the set of resources are identified in an eNB discovery resource pool message received at the InC UE device from the eNB. The OoC UE device selects communication resources from the set of communication resources to transmit a discovery signal.

14 Claims, 4 Drawing Sheets

(51) Int. Cl.
*H04W 56/00* (2009.01)
*H04W 72/02* (2009.01)
*H04W 72/04* (2009.01)
*H04W 76/14* (2018.01)
*H04W 88/04* (2009.01)

(52) U.S. Cl.
CPC ....... *H04W 56/0025* (2013.01); *H04W 72/02* (2013.01); *H04W 72/0406* (2013.01); *H04W 76/14* (2018.02); *H04W 88/04* (2013.01)

(56) References Cited

U.S. PATENT DOCUMENTS

| | | | |
|---|---|---|---|
| 2017/0142703 A1* | 5/2017 | Xue | H04W 48/08 |
| 2017/0171837 A1* | 6/2017 | Chen | H04W 72/04 |
| 2017/0188320 A1* | 6/2017 | Xiong | H04W 72/044 |
| 2017/0195995 A1* | 7/2017 | Zhu | H04W 72/04 |
| 2017/0230938 A1* | 8/2017 | Huang | H04W 76/10 |
| 2017/0325243 A1* | 11/2017 | Yasukawa | H04W 48/08 |
| 2018/0035452 A1* | 2/2018 | Yu | H04W 56/0025 |
| 2018/0092019 A1* | 3/2018 | Yasukawa | H04W 88/04 |
| 2018/0110037 A1* | 4/2018 | Yasukawa | H04W 76/14 |
| 2018/0110060 A1* | 4/2018 | Huang | H04W 72/1215 |
| 2018/0152915 A1* | 5/2018 | Kalhan | H04W 72/04 |
| 2018/0338319 A1* | 11/2018 | Kim | H04W 76/14 |
| 2018/0352411 A1* | 12/2018 | Ryu | H04W 40/08 |
| 2019/0014490 A1* | 1/2019 | Kim | H04W 24/02 |

OTHER PUBLICATIONS

LG Electronics Inc; "Support of D2D discovery out of coverage"; R2-140794; 3GPP TSG RAN WG2 Meeting #85; Prague, Czech Republic; Feb. 10-14, 2014.

Intel Corporation; "Clarification of ProSe synchronizatin procedure"; R2-150616; 3GPP TSG RAN WG2 Meeting #89; Athens, Greece; Feb. 9-13, 2015.

Qualcomm Incorporated; "Simulation assumptions for D2D synchronization requirements"; R4-150201; 3GPP TSG RAN WG4 Meeting #74; Athens, Greece; Feb. 9-13, 2015.

Kyocera; "Consideration of ProSe discovery in partial and outside network coverage"; R2-151531; 3GPP TSG RAN NG2 Meeting #89-bis; Bratislava, Slovak Republic; Apr. 20-24, 2015.

* cited by examiner

DEVICE TO-DEVICE SYNCHRONIZATION SIGNAL (D2DSS) RESOURCE MANAGEMENT

CLAIM OF PRIORITY

The present application claims priority to Provisional Application No. 62/145,916 entitled "System, Method, and Device For Broadcasting The Discovery Resource Pool Information Received from the Serving-Cell eNB SIB-19," filed Apr. 10, 2015, assigned to the assignee hereof and hereby expressly incorporated by reference in its entirety.

FIELD

This invention generally relates to wireless communications and more particularly to management of resources for transmission of device-to-device (D2D) synchronization signals.

BACKGROUND

Many wireless communication systems use eNBs (base stations, eNodeBs, eNBs) to provide geographical service areas where wireless communication user equipment devices (UE devices) communicate with the eNB providing the particular geographical service area in which the UE devices are located. The eNBs are connected within a network allowing communication links to be made between the wireless communication devices and other devices. In some circumstances, the communication links are between wireless communication UE devices that are close to each other. In these situations, it may be preferred to have a direct communication link between the two wireless UE devices rather than communicating through a base station. Such direct communication between devices is often referred to as device-to-device (D2D) communication or peer-to-peer (P2P) communication. The communication resources (e.g., time-frequency blocks) used for D2D communication are typically a subset of the communication resources used by the communication system for communication between UE devices and the eNBs.

An in-coverage UE device (InC UE device) is a UE device that is within the service area of an eNB and is capable of communication with the eNB. An out-of-coverage UE device (OoC UE device) is a UE device that is not within a service area of any eNB. D2D UE devices that are engaged in D2D communication with each other form a D2D group. A D2D group, therefore, includes two or more D2D UE devices. There are several coverage scenarios that may occur with D2D groups. In an InC coverage scenario, all the UE devices of the D2D group are located in a service area of a single eNB. For the InC scenario, therefore, all of the D2D UE devices of the D2D group are InC UE devices in a single service area. In an OoC coverage scenario, none of the UE devices of the D2D group are located inside any service area of any eNB. For such a scenario, therefore, all of the D2D UE devices of the D2D group are OoC UE devices. In a partial coverage scenario, at least one of the UE devices of the D2D group is located in a service area of a single eNB and at least one D2D UE device of the group is outside all service areas. For the partial coverage scenario, therefore, at least one of the D2D UE devices of the D2D group is an InC UE device in a single service area and at least one UE device is an OoC UE device. Other coverage scenarios are possible.

In order to maintain synchronization of communication within a D2D group, a synchronization signal is typically received by the UE devices in the group. In some situations, the synchronization signal is transmitted by the eNB. Such a situation occurs where all the D2D UE devices are in coverage. In some situations, a D2D synchronization signal (D2DSS) is transmitted by one or more of the D2D UE devices in the D2D group to maintain synchronization. When available to the D2DSS transmitting D2D UE device, the D2DSS is based on system timing obtained directly from the eNB. In some situations, however, the UE device cannot obtain the timing information directly from the eNB and the D2DSS is not based on timing directly obtained from the eNB. Proposals for 3GPP LTE revisions include a mechanism for indicating whether a D2DSS is based on timing directly obtained from the eNB or not.

SUMMARY

An in-coverage (InC) user equipment (UE) device transmits a device-to-device synchronization signal (D2DSS) and device-to-device (D2D) discovery resource pool information message to an out-of-coverage (OoC) UE device. The D2DSS is based on timing information obtained directly from an eNB and based on at least one of a primary synchronization signal (PSS) and a secondary synchronization signal (SSS). The D2D discovery resource pool information message identifies a set of communication resources authorized for transmission of D2D discovery signals where the set of resources are identified in an eNB discovery resource pool message received at the InC UE device from the eNB. The OoC UE device selects communication resources from the set of communication resources to transmit a discovery signal.

DETAILED DESCRIPTION

D2D UE devices transmit discovery signals allowing other D2D UE devices to identify potential D2D communication partners. For the examples herein, D2D discovery signals are sent using D2D discovery communication resources assigned for D2D discovery transmission by the communication system. As described below, the eNBs identify a set of D2D communication resources in eNB discovery resource pool messages. Since only InC UE devices can receive the messages, however, a mechanism is needed to inform OoC UE devices of the set of communication resources allocated for D2D discovery signal transmission. For the examples herein, InC UE devices near the cell boundaries transmit D2D discovery resource pool messages identifying the set of communication resources authorized for transmission of D2D discovery signals.

Figure 1:
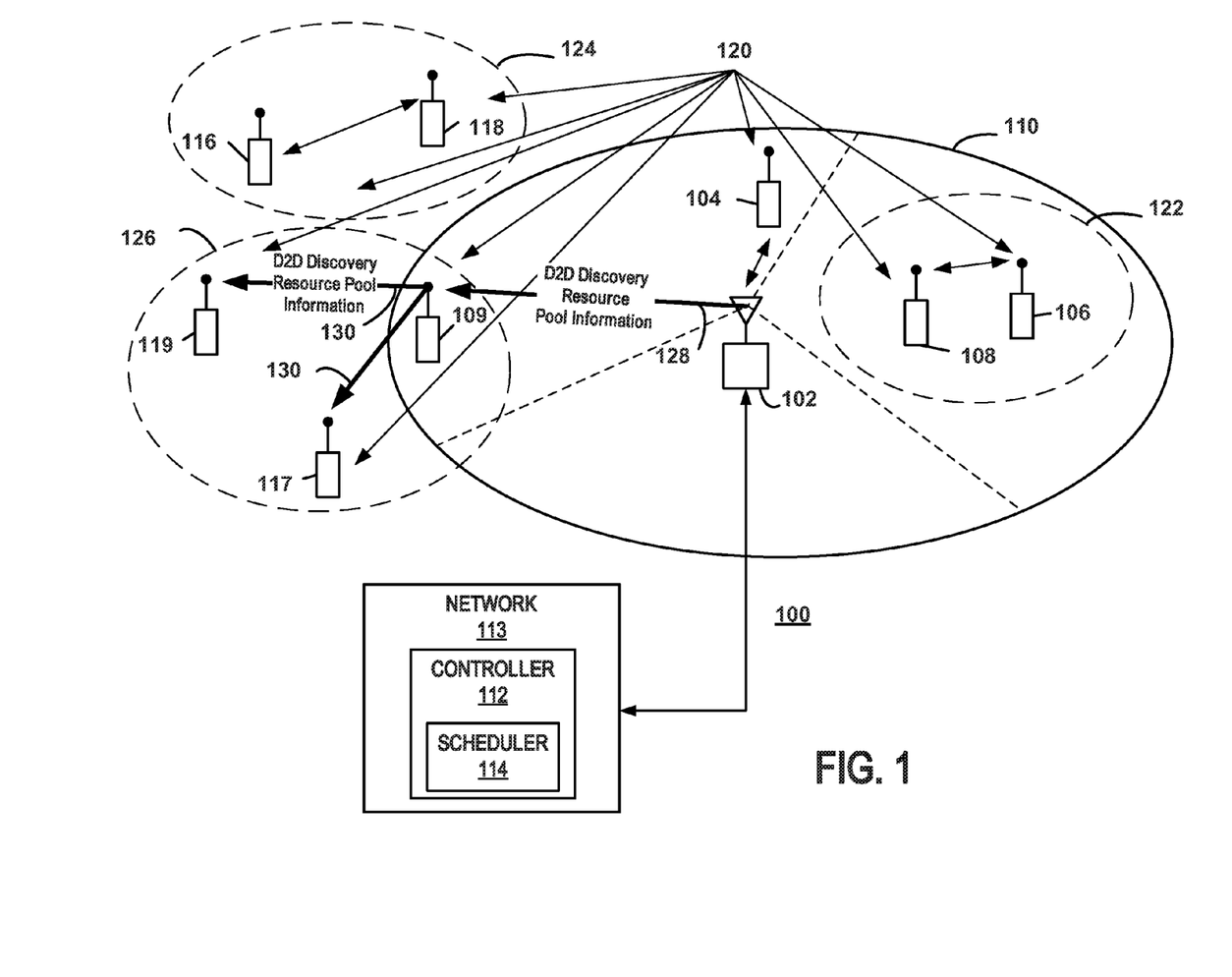
FIG. 1 is an illustration of a communication system 100 where macrocell communication resources are used for device-to device (D2D) communication.

FIG. 1 is an illustration of a communication system 100 where macrocell communication resources are used for device-to device (D2D) communication. An eNB (base station, eNodeB, eNB) 102 provides wireless communication services to wireless communication UE devices 104, 106, 108 within a geographical service area 110, sometimes referred to as a cell. Several eNBs are typically interconnected through a backhaul to provide several service areas to cover large areas. The various functions and operations of the blocks described with reference to the communication system 100 may be implemented in any number of devices, circuits, or elements. Two or more of the functional blocks may be integrated in a single device and the functions described as performed in any single device may be implemented over several devices. For example, at least some of the functions of the controller 112 may be performed by the eNB 102 and vice versa. A cellular communication system is typically required to adhere to a communication standard or specification. The Third-Generation Partnership Project Long-Term Evolution (3GPP LTE) communication specification is a specification for systems where base stations (eNodeBs) provide service to wireless communication devices (user equipment (UE) devices) using orthogonal frequency-division multiple access (OFDMA) on the downlink and single-carrier frequency-division multiple access (SC-FDMA) on the uplink. Although the techniques described herein may be applied in other types of communication systems, the exemplary systems discussed herein operate in accordance with a 3GPP LTE communication specification.

The eNB 102 is a fixed transceiver station, sometimes referred to as a base station, an evolved Node B or eNodeB, which may include a controller in some circumstances. The eNB 102 is connected to a controller 112 within a network 113 through a backhaul which may include any combination of wired, optical, and/or wireless communication channels. For the examples herein, the controller 112 includes the functionality of the Mobility Management Entity (MME) and the Packet Gateway (P-GW). Accordingly, the controller 112 includes a scheduler 114. In the example, the scheduler 114 allocates time-frequency resources for communication between the wireless communication devices 104, 106, 108, 109 as well as between the base station 102 and the wireless communication devices 104, 106, 108, 109. UE communication devices 116, 117, 118, 119 outside of the geographic service area 110 are capable of receiving wireless service from the eNB 102 when the devices 116, 117, 118, 119 are within the service area 110. Since, the devices 116, 117, 118, 119 however, are out of range of the eNB 102, they cannot receive timing information directly from the eNB 102.

The wireless (UE) communication devices 104, 106, 108, 116, 117, 118, 119 (collectively UE devices 120) may be referred to as mobile devices, wireless devices, wireless communication devices, and mobile wireless devices, UEs, and UE devices, as well as by other terms. The UE devices 120 include electronics and code for communicating with base stations and with other wireless communication devices in device-to-device configurations. The wireless communication devices include devices such as cell phones, personal digital assistants (PDAs), wireless modem cards, wireless modems, televisions with wireless communication electronics, and laptop and desktop computers as well as other devices. The combination of wireless communication electronics with an electronic device, therefore, may form a UE device 120. For example, a UE device 120 may include a wireless modem connected to an appliance, computer, television, or other device.

The eNB 102 includes a wireless transceiver that can exchange wireless signals with the UE devices 104, 106, 108, 109 within the service area 110. Transmissions from the base stations and from the UE devices 104, 106, 108, 109 are governed by a communication specification that defines signaling, protocols, and parameters of the transmission. The communication specification may provide strict rules for communication and may also provide general requirements where specific implementations may vary while still adhering to the communication specification. Although the discussion below is directed to the 3GPP Long Term Evolution (LTE) communication specification, other communication specifications may be used in some circumstances. The communication specification defines at least a data channel and a control channel for uplink and downlink transmissions and specifies at least some timing and frequency parameters for physical downlink control channels from a base station to a UE device 120. System timing information provided to the UE devices allows for synchronization of communication.

As explained above, in some situations, two or more UE devices may communicate directly with each other without communication through a base station. Such device-to-device (D2D) communication may occur between UE devices within the service area of a base station or outside the service area. For the example discussed herein, the in coverage (InC) D2D UE devices 106, 108 in a first D2D group 122 are within the service area 110 and communicate with each other using D2D communication. Out of Coverage (OoC) D2D UE devices 116, 118 in a second D2D group are outside of the service area 110 and communicate with each other using D2D communication. In a partial coverage scenario, at least one of the D2D UE devices of the D2D group is located in a service area of a single eNB and at least one D2D UE device of the group is outside all service areas. In a partial coverage scenario, therefore, at least one of the D2D UE devices of the D2D group is an InC UE device in a single service area and at least one UE device is an OoC UE device. The partial coverage D2D group 126 in FIG. 1 includes an InC D2D UE device 109, a first OoC D2D UE device 117 and a second OoC D2D UE device 119.

Typically, a D2D synchronization signal (D2DSS) is transmitted by one of the D2D UE devices in a D2D group to maintain synchronization. When available to the transmitting D2D UE device, the D2DSS is based on system timing obtained directly from the eNB. In some situations, however, the UE device cannot obtain the timing information directly from the eNB and the D2DSS is not based on timing directly obtained from the eNB. In system operating in accordance with a 3GPP LTE specification (such as Release-12), the D2D timing information is provided using the D2DSS signaling. As is known, D2DSS is analogous to Primary Synchronization Signal/Secondary Synchronization Signal (PSS/SSS) channels that are transmitted from base stations to UE devices on downlink resources. D2DSS signals, however, are transmitted using SC-FDMA since D2D communication utilizes uplink communication resources. The UE devices use the D2DSS to determine frame and subframe boundaries, thereby, determining timing information. The D2DSS resources are available for all D2D data and control channel transmissions. Although a D2D UE device has available resources for transmitting the D2DSS as configured by the base station, however, there may be situations where at least some of the D2D UE devices in a D2D group do not transmit D2DSS (i.e., timing information). For example, if the D2D group is in the InC scenario, all D2D UE devices in the D2D group are receiving PSS/SSS and are deriving timing information from the base station. As a result, there is no need to transmit D2DSS within the group.

In OoC scenarios, the D2D timing cannot be derived directly from system timing since none of the UE devices are receiving PSS/SSS from a base station. At least one D2D UE device in the group transmits D2DSS.

For partial coverage scenarios, the D2D timing is provided by a D2D UE device that derives the timing from an eNB connected to the network. More specifically, at least one of the UE devices within coverage transits D2DSS based on the system timing derived from via PSS/SSS.

For the examples herein, OoC D2D UE devices 117, 119 near cell boundaries receive D2DSS and D2D discovery resource pool information from Inc UE devices 109 near the cell boundaries. The D2DSS and D2D discovery resource pool information can be received form the same InC UE device or may be received from different InC UE devices. During a partial coverage scenario, the eNB 102 transmits D2D discovery resource pool information message 128 that identifies the set of resources that can be used by D2D UEs for transmitting D2D discovery signals and InC D2D UE devices 109 receiving the information 128 transmit the information in another D2D discovery resource pool information message 130. The OoC D2D UE devices 117, 119 receive the information 130 and select communication resources from the identified pool of resources for transmitting their own discovery signal.

Figure 2:
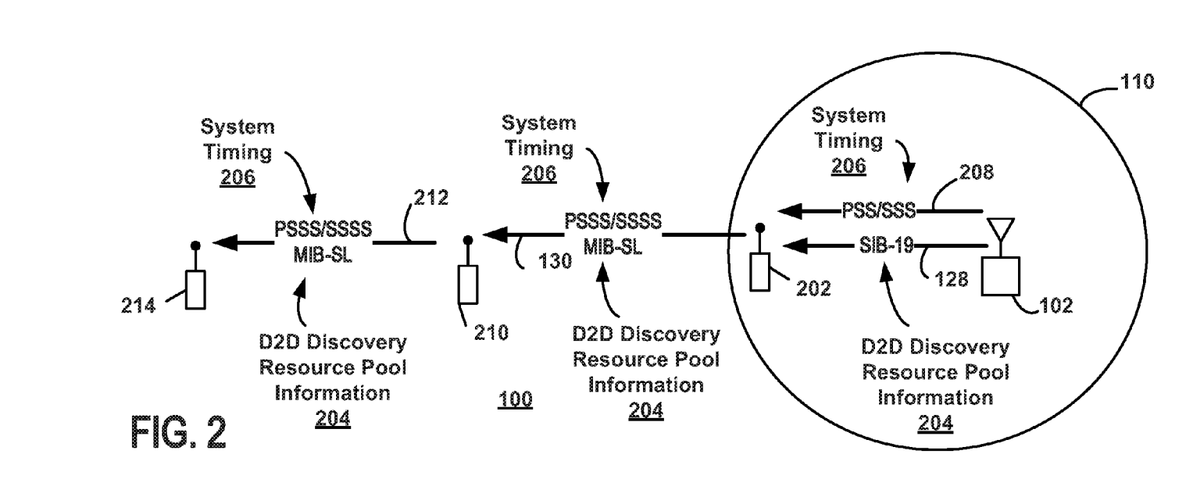
FIG. 2 is block diagram of the communication system 100 for an example where D2D discovery resource pool information is transmitted by an InC D2D UE device 202 using a Master Information Block-Side Link (MIB-SL) within a Physical Side Link Broadcast Channel (PSBCH) in accordance with the at least one revision of the 3GPP LTE communication specification.

FIG. 2 is block diagram of the communication system 100 for an example where D2D discovery resource pool information is transmitted by an InC D2D UE device 202 using a Master Information Block-Side Link (MIB-SL) within a Physical Side Link Broadcast Channel (PSBCH) in accordance with the at least one revision of the 3GPP LTE communication specification. Accordingly, FIG. 2 is an illustration of one example of the D2D discovery resource pool information message 130 transmission in FIG. 1.

The eNB 102 transmits D2D discovery resource pool information 204 in the D2D discovery resource pool information message 128 and transmits system timing information 206 to UE devices within the service area of the eNB. For the examples herein, the D2D discovery resource pool information 204 is within a System Information Block Type 19 (SIB-19) transmission 208 and the system timing information 206 is provided by a Primary Synchronization Signal (PSS) and a Secondary Synchronization Signal (SSS) (PSS/SSS) 208 in accordance with at least one revision of the 3GPP LTE communication specification.

The InC D2D UE device 202 within the cell boundary receives the transmissions 128, 208 and transmits another message 130 that includes the system timing 204 and the D2D discovery resource pool information 204. The D2D discovery resource pool information 204 is transmitted in the MIB-SL within the PSBCH. The system timing is provided with a PSSS/SSSS transmission. For the example, the D2D discovery resource pool information 204 and the PSSS/SSSS are transmitted within the same subframe. In some situations, the D2D discovery resource pool information 204 and the PSSS/SSSS can be transmitted within different subframes.

An OoC D2D UE devices 210 receives the D2D discovery resource pool information 204 and the system timing 204 in the message 130 and can retransmit the information in a discovery resource pool information message 212 that includes the system timing 204 and the D2D discovery resource pool information 204. The D2D discovery resource pool information 204 is transmitted in the MIB-SL within the PSBCH. Other data and control channels can be used in some situations. For example, the OoC UE device can receive the D2D discovery resource pool message by receiving the D2D discovery resource pool message within a D2D data channel transmitted in accordance with the at least one revision of the 3GPP LTE communication specification. The system timing is provided with a PSSS/SSSS transmission. For the example, the D2D discovery resource pool information 204 and the PSSS/SSSS are transmitted within the same subframe. In some situations, the D2D discovery resource pool information 204 and the PSSS/SSSS can be transmitted within different subframes. For the examples herein, the discovery resource pool information message 212 is similar to the discovery resource pool information message 130 except that the discovery resource pool information message 130 indicates that the system timing 206 has been derived from system timing obtained directly from an eNB and the discovery resource pool information message 212 indicates that the system timing 206 is not obtained directly from an eNB. Each D2D UE device 202, 210, 214 receiving the discovery resource pool information 204 selects resources from the set of resources identified by the discovery resource pool information 204 and transmits DSDSS using the selected resources and the system timing 206.

Figure 3:
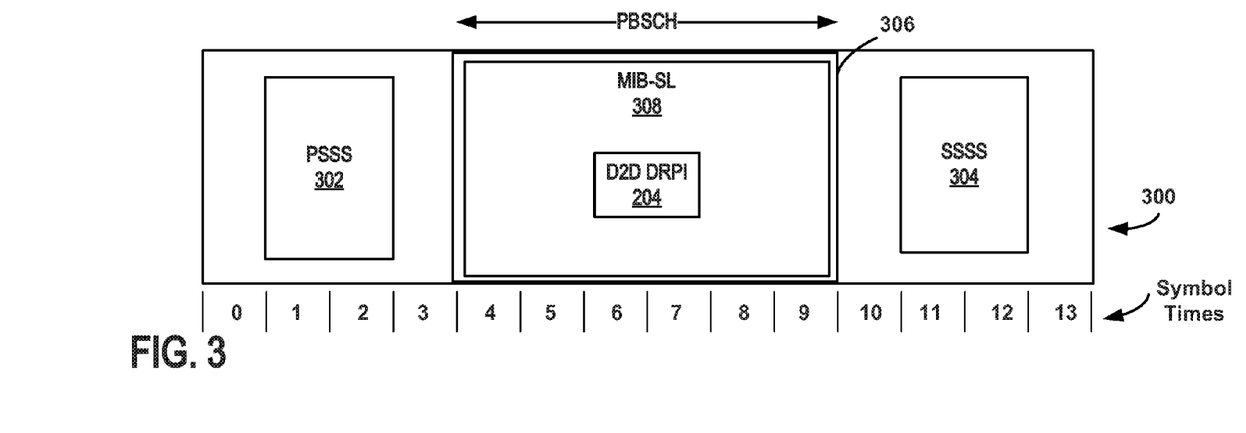
FIG. 3 is a block diagram of a user equipment (UE) device suitable for use as the UE devices.

FIG. 3 is a block diagram of an example of a discovery resource pool information message 300 where the system timing and the discovery resource pool information 204 are transmitted with the same subframe. The discovery resource pool information message 300 of FIG. 3, therefore, is an example of a message suitable for the discovery resource pool information message 212 and the discovery resource pool information message 130.

For the example of FIG. 3, the PSSS 302 and the SSSS 304 occupy time frequency resources at the beginning and end of the subframe. Of symbol times 0 to 13 of the subframe, the PSSS 302 may occupy symbol time 1 and symbol time 2 and the SSSS 304 may occupy symbol time 1 and symbol time 2, for example. The PSBCH 306 is centered in the subframe at symbol time 4 through symbol time 9. The MIB-SL 308 is distributed within the PSBCH 306. For the examples herein, the D2D discovery resource pool information (D2D DRPI) 204 is transmitted using the MIB-SL-308. Other techniques may be used in some circumstances.

Figure 4:
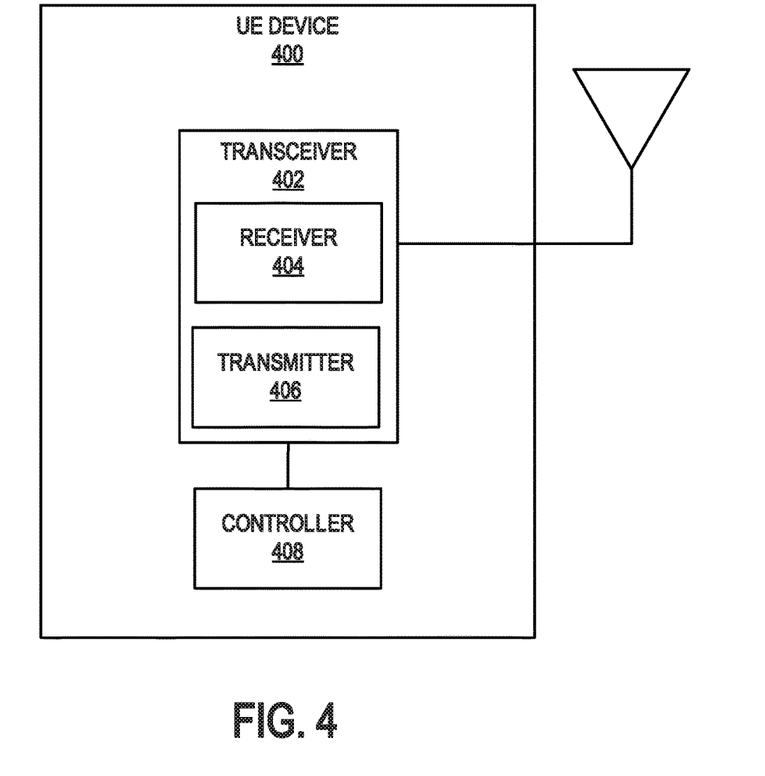
FIG. 4 s a block diagram of a user equipment (UE) device

FIG. 4 is a block diagram of a user equipment (UE) device 300 suitable for use as the UE devices 202, 210, 214. Each of the UE devices includes a transceiver 402 a controller 404, as well as other components and circuitry (not shown) such as memory, for example. The transceiver 402 includes a transmitter 404 and a receiver 406. The transceiver 402 transmits uplink wireless signals to base stations and receives downlink wireless signals from the base stations. The transceiver can also be configured to transmit and receive D2D signals using allocated uplink communication resources. The controller 404 controls components of the mobile wireless communication device to manage the functions of the device described herein as well as to facilitate the overall functionality of the device 400. The controller 404 is connected to the transceiver 402 and other components such as memory.

Figure 5:
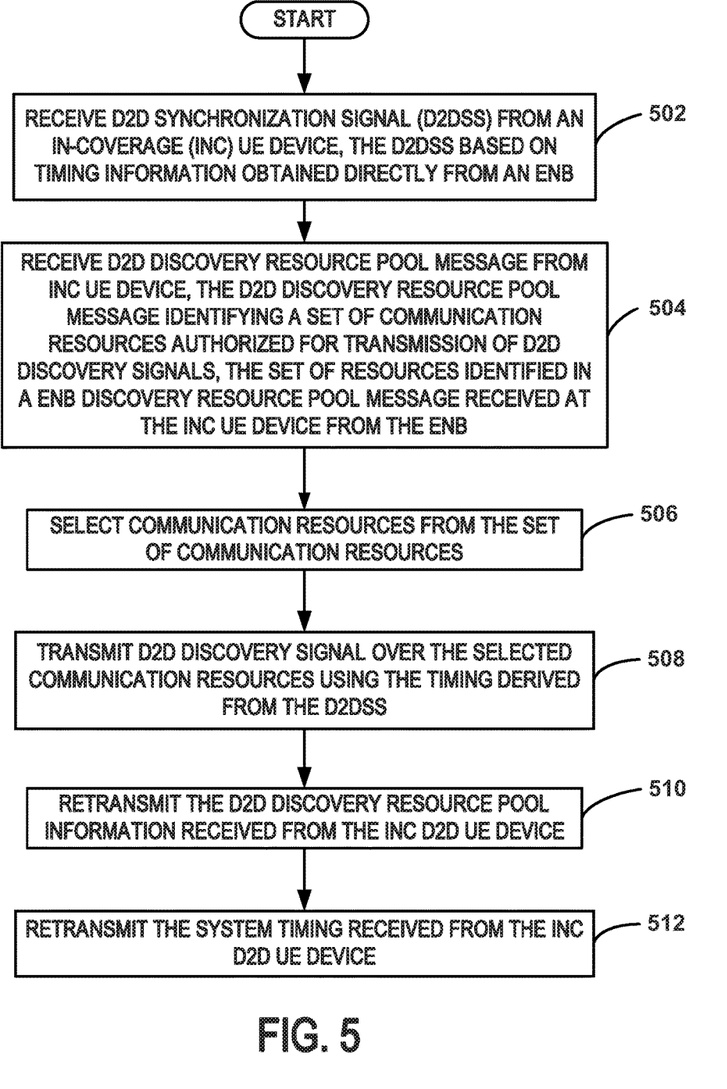
FIG. 5 is a flow chart of a method of managing D2DSS transmission performed in an OoC D2D UE device.

FIG. 5 is a flow chart of a method of managing D2DSS transmission performed in an OoC D2D UE device. The example of FIG. 5, therefore, may be performed by the OoC D2D UE 210 in FIG. 2.

At step 502, the D2D UE device 210 receives a D2DSS from an in-coverage (InC) UE device such as the InC D2D UE device 202. The D2DSS is based on timing information obtained directly from an eNB and based on at least one of a primary synchronization signal (PSS) and a secondary synchronization signal (SSS) transmitted by the eNB 102.

At step 504, the D2D UE device 210 receives a D2D discovery resource pool message 130 from the InC UE device. As discussed above, the D2D discovery resource pool message 130 identifies a set of communication resources authorized for transmission of D2D discovery signals. The set of resources are identified in a eNB discovery resource pool message received at the InC UE device from the eNB 102. For the examples, the D2DSS and the D2D discovery resource pool information are transmitted within the same subframe in the D2D discovery resource pool message 130. The D2D discovery resource pool information message 130 may include information indicating that the timing and/or D2D discovery resource pool information was obtained directly from an eNB.

At step 506, the D2D UE device 210 selects communication resources from the set of communication resources. These selected communication resources are a subset of the set of communication resources for the examples herein.

At step 508, the D2D UE device 210 transmits a D2D discovery signal over the selected communication resources using the timing derived from the D2DSS.

At step 510, the D2D UE device 210 retransmits the D2D discovery resource pool information received from the InC D2D UE device. The D2D UE device 210 transmits another D2D discovery resource pool message 212 identifying the set of communication resources.

At step 512, the D2D UE device 210 retransmits the system timing received from the InC D2D UE device. The D2D UE device 210 transmits another D2DSS where the another D2DSS is based on timing information obtained from the D2DSS received from the InC UE device. For the examples, the D2DSS and the D2D discovery resource pool information are transmitted within the same subframe in the D2D discovery resource pool message 212. The D2D discovery resource pool information message may include information indicating that the timing and/or D2D discovery resource pool information was not obtained directly from an eNB. In some situations, steps 510 and 512 can be omitted.

Clearly, other embodiments and modifications of this invention will occur readily to those of ordinary skill in the art in view of these teachings. The above description is illustrative and not restrictive. This invention is to be limited only by the following claims, which include all such embodiments and modifications when viewed in conjunction with the above specification and accompanying drawings. The scope of the invention should, therefore, be determined not with reference to the above description, but instead should be determined with reference to the appended claims along with their full scope of equivalents.

The invention claimed is:

1. A method performed at an out-of-coverage (OoC) device-to-device (D2D) user equipment (UE) device, the method comprising:
   receiving a D2D synchronization signal (D2DSS) from an in-coverage (InC) UE device, the D2DSS based on timing information obtained directly from an eNB and based on at least one of a primary synchronization signal (PSS) and a secondary synchronization signal (SSS);
   receiving, from the InC UE device, a D2D discovery resource pool message within a Master Information Block-Side Link (MIB-SL) within a Physical Side Link Broadcast Channel (PSBCH) in accordance with the at least one revision of the 3GPP LTE communication specification, the D2D discovery resource pool message identifying a set of communication resources authorized for transmission of D2D discovery signals, the set of resources identified in a eNB discovery resource pool message received at the InC UE device from the eNB;
   selecting selected communication resources from the set of communication resources; and
   transmitting D2D discovery signal over the selected communication resources using the timing derived from the D2DSS.

2. The method of claim 1, wherein the D2DSS comprises a primary sidelink synchronization signal (PSSS) and a secondary sidelink synchronization signal (SSSS), the PSSS and SSSS transmitted in accordance with at least one revision of The Third-Generation Partnership Project Long-Term Evolution (3GPP LTE) communication specification.

3. The method of claim 2, wherein receiving the D2D discovery resource pool message comprises receiving the D2D discovery resource pool message within a D2D data channel transmitted in accordance with the at least one revision of the 3GPP LTE communication specification.

4. The method of claim 1, wherein the MIB-SL comprises an in-coverage indicator indicating that the InC UE device is within a coverage area of the eNB.

5. The method of claim 1, further comprising:
   transmitting another D2DSS, the another D2DSS based on timing information obtained from the D2DSS received from the InC UE device; and
   transmitting another D2D discovery resource pool message identifying the set of communication resources.

6. The method of claim 5, wherein transmitting the another D2D discovery resource pool message comprises transmitting the discovery another D2D discovery resource pool message in another MIB-SL within the PSBCH.

7. The method of claim 6, wherein the another MIB-SL comprises another in coverage flag indicating that the OoC UE D2D device is not within any coverage area of any eNB.

8. A device-to-device (D2D) user equipment (UE) device, the D2D UE device comprising:
   a receiver configured to:
      receive a D2D synchronization signal (D2DSS) from an in-coverage (InC) UE device while the D2D UE device is out of coverage, the D2DSS based on timing information obtained directly from an eNB and based on at least one of a primary synchronization signal (PSS) and a secondary synchronization signal (SSS); and
      receive, from the InC UE device, a D2D discovery resource pool message within a Master Information Block-Side Link (MIB-SL) within a Physical Side Link Broadcast Channel (PSBCH) in accordance with the at least one revision of the 3GPP LTE communication specification, the D2D discovery resource pool message identifying a set of communication resources authorized for transmission of D2D discovery signals, the set of resources identified in a eNB discovery resource pool message received at the InC UE device from the eNB; and a transmitter configured to transmit a D2D discovery signal over selected communication resources using the timing derived from the D2DSS, the selected communication resources selected from the set of communication resources.

9. The D2D UE device of claim 8, wherein the D2DSS comprises a primary sidelink synchronization signal (PSSS) and a secondary sidelink synchronization signal (SSSS), the PSSS and SSSS transmitted in accordance with at least one revision of The Third-Generation Partnership Project Long-Term Evolution (3GPP LTE) communication specification.

10. The D2D UE device of claim 9, wherein the receiver is configured to receive the D2D discovery resource pool message by receiving the D2D discovery resource pool message within D2D data channel in accordance with the at least one revision of the 3GPP LTE communication specification.

11. The D2D UE device of claim 8, wherein the MIB-SL comprises an in coverage flag indicating that the InC UE device is within a coverage area of the eNB.

12. The D2D UE device of claim 8, wherein the transmitter is further configured to:

transmit another D2DSS, the another D2DSS based on timing information obtained from the D2DSS received from the InC UE device; and transmit another D2D discovery resource pool message identifying the set of communication resources.

13. The D2D UE device of claim 12, wherein the transmitter is configured to transmit the another D2D discovery resource pool message by transmitting the another D2D discovery resource pool message in another MIB-SL within the PSBCH.

14. The D2D UE device of claim 13, wherein the another MIB-SL comprises another in coverage flag indicating that the D2D UE device is not within any coverage area of any eNB.

* * * * *